United States Patent
Chen et al.

(10) Patent No.: US 10,496,597 B2
(45) Date of Patent: Dec. 3, 2019

(54) ON-CHIP DATA PARTITIONING READ-WRITE METHOD, SYSTEM, AND DEVICE

(71) Applicant: Institute of Computing Technology, Chinese Academy of Sciences, Beijing (CN)

(72) Inventors: Tianshi Chen, Beijing (CN); Zidong Du, Beijing (CN); Qi Guo, Beijing (CN); Yunji Chen, Beijing (CN)

(73) Assignee: INSTITUTE OF COMPUTING TECHNOLOGY, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/071,458

(22) PCT Filed: Aug. 9, 2016

(86) PCT No.: PCT/CN2016/094168
§ 371 (c)(1),
(2) Date: Jul. 19, 2018

(87) PCT Pub. No.: WO2017/173755
PCT Pub. Date: Oct. 12, 2017

(65) Prior Publication Data
US 2019/0026246 A1    Jan. 24, 2019

(30) Foreign Application Priority Data
Apr. 6, 2016    (CN) .......................... 2016 1 0210082

(51) Int. Cl.
*G06F 15/78*    (2006.01)
*G06F 3/06*    (2006.01)

(52) U.S. Cl.
CPC ............ *G06F 15/781* (2013.01); *G06F 3/061* (2013.01); *G06F 3/064* (2013.01); *G06F 15/78* (2013.01); *G06F 2003/0692* (2013.01)

(58) Field of Classification Search
CPC ........ G06F 15/781; G06F 3/061; G06F 3/064; G06F 5/78
See application file for complete search history.

(56) References Cited

U.S. PATENT DOCUMENTS 8,595,437 B1 * 11/2013 Glasco ................ G06F 12/0804
711/118
2010/0064110 A1    3/2010 Boettcher et al.
(Continued)

FOREIGN PATENT DOCUMENTS

| CN | 101034384 A | 9/2007 |
| CN | 101452422 A | 6/2009 |

(Continued)

OTHER PUBLICATIONS

International Search Report dated Jan. 11, 2017 in related PCT Application No. PCT/CN2016/094168.

*Primary Examiner* — Tri H Hoang
(74) *Attorney, Agent, or Firm* — Maschoff Brennan (57) ABSTRACT

The present invention is directed to the storage technical field and discloses an on-chip data partitioning read-write method, the method comprises: a data partitioning step for storing on-chip data in different areas, and storing the on-chip data in an on-chip storage medium and an off-chip storage medium respectively, based on a data partitioning strategy; a pre-operation step for performing an operational processing of an on-chip address index of the on-chip storage data in advance when implementing data splicing; and a data splicing step, for splicing the on-chip storage data and the off-chip input data to obtain a representation of the original data based on a data splicing strategy. Also provided (Continued)

are a corresponding on-chip data partitioning read-write system and device. Thus, read and write of repeated data can be efficiently realized, reducing memory access bandwidth requirements while providing good flexibility, thus reducing on-chip storage overhead.

16 Claims, 4 Drawing Sheets

(56) References Cited

U.S. PATENT DOCUMENTS

2016/0154590 A1* 6/2016 Fan ................ G06F 9/3824
　　　　　　　　　　　　　　　　711/118
2016/0218739 A1* 7/2016 Lee ............... G06F 12/0207

FOREIGN PATENT DOCUMENTS

| CN | 102025634 A | 4/2011 |
| CN | 104035903 A | 9/2014 |
| CN | 104699630 A | 6/2015 |

* cited by examiner

ON-CHIP DATA PARTITIONING READ-WRITE METHOD, SYSTEM, AND DEVICE

TECHNICAL FIELD

The present invention relates to an information security field and an integrated circuit field, especially relates to a hardware security design, and in particular, relates to an on-chip data partitioning read-write method, an on-chip data partitioning read-write system and an on-chip read-write device.

BACKGROUND

With extensive use of electronic devices, in the era of big data, more and more devices are required to perform more and more complex processing on real-time input of the real world, such as, industrial robots, automatic driving of unmanned car and mobile devices, etc. These tasks are mostly partial to the machine learning field, where most operations are vector operations or matrix operations, which have a high degree of parallelism. As compared to the traditional common GPU/CPU acceleration scheme, the hardware ASIC accelerator is the most popular acceleration scheme at present. On one hand, it can provide a high degree of parallelism and can achieve high performance, and on the other hand, it has high energy efficiency.

However, the bandwidth becomes a bottleneck that limits the performance of the accelerator, and the common solution is to balance disequilibrium of the bandwidth through a cache positioned on the chip. These common solutions do not optimize reading and writing of the data, and cannot better utilize characteristics of the data, such that cost of the on-chip storage is too much, and cost of data reading and writing is too much. As for current common machine learning algorithms, most of the data have reusability, i.e., the same data will be used for many times, such that the data has the same part, such as, a weight in the neural network.

In conclusion, the prior art obviously has inconvenience and defects in practical use, so it is necessary to make improvement.

SUMMARY

With respect to the above deficiencies, an object of the present invention is to provide an on-chip data partitioning read-write system and a method of implementing the same, and the object is to efficiently read and write repeated data, reduce memory access bandwidth requirements while providing good flexibility, and hence reducing on-chip storage overhead In order to achieve the object, the present invention provides an on-chip data partitioning read-write method, comprising:

a data partitioning step for partitioning on-chip data in different areas, and storing the on-chip data in an on-chip storage medium and an off-chip storage medium respectively, according to a data partitioning strategy;

a pre-operation step for performing an operational processing of an on-chip address index of the on-chip storage data in advance when implementing data splicing; and a data splicing step for splicing the on-chip storage data and the off-chip input data to obtain a representation of the original data based on a data splicing strategy.

Regarding the on-chip data partitioning read-write method of the present invention, it further comprises:

a data storing step for carrying the on-chip storage data of the on-chip storage medium and the off-chip input data from the off-chip storage medium;

read-write ports are separated in the data storing step, and read and write of the data are independent from each other;

the pre-operation step further comprises:

performing an operational processing of the on-chip storage data;

performing an operational processing of external input data; and the external input data comprises the off-chip input data, and data directly read from the read-write ports.

Regarding the on-chip data partitioning read-write method of the present invention, the data storing step further comprises:

indexing the on-chip storage data based on the on-chip address index;

outputting the indexed on-chip storage data to an exit;

writing the data to be stored into corresponding storage positions based on writing addresses.

Regarding the on-chip data partitioning read-write method of the present invention, the data partitioning step further comprises:

partitioning an address space into an off-chip data space and an on-chip data space;

performing data replacement between the on-chip storage medium and the off-chip storage medium based on a data replacement strategy, wherein the data replacement strategy comprises an ordinal replacement, a reversed replacement and a random replacement;

the data partitioning strategy comprises fixed-point number partitioning and floating-point number partitioning;

the data splicing step further comprises:

converting an on-chip and off-chip data transmission form from the representation of the original data into all or partial data index to splice results of the all or partial data index on a chip to acquire the representation of the original data;

the data splicing step is carried out through an on-chip and off-chip data path, or an on-chip data path, the on-chip and off-chip data path comprises PCI, PCIE and HT interconnection techniques, the on-chip data path comprises FAT-TREE and H-TREE interconnection techniques, and the on-chip and off-chip connection way comprises a multichip interconnection structure;

the data in the on-chip storage medium or the off-chip storage medium can be read and written once or for many times, and the data can be read into one or more on-chip calculation units; the on-chip storage medium or the off-chip storage medium can be read and written from outside once or for many times, and the medium can be read and written from inside once or for many times.

The present invention provides an on-chip data partitioning read-write system, comprising:

a data partitioning module for partitioning on-chip storage data into different areas, and storing the on-chip storage data in an on-chip storage medium and an off-chip storage medium respectively, based on a data partitioning strategy;

a pre-operation module for performing an operational processing of an on-chip address index of the on-chip storage data in advance when implementing data splicing; and a data splicing module for splicing the on-chip storage data and the off-chip input data to obtain a representation of the original data based on a splicing strategy.

Regarding the on-chip data partitioning read-write system of the present invention, it further comprises:

a storage module for carrying the on-chip storage data of the on-chip storage medium and the off-chip input data from the off-chip storage medium;

the read port and the write port which are separated from each other are adopted in the storage module, and read and write of the data are independent from each other;

the pre-operation module further comprises:

an on-chip processing submodule for performing an operational processing of the on-chip storage data;

an off-chip processing submodule for performing an operational processing of external input data; and the external input data comprises the off-chip input data, and data directly read from the read-write ports.

Regarding the on-chip data partitioning read-write system of the present invention, the storage module further comprises:

an address index interface for indexing the on-chip storage data based on the on-chip address index;

a data read-out interface for outputting the indexed on-chip storage data to an exit;

a data write-in interface for writing the data to be stored into corresponding storage positions based on writing addresses.

Regarding the on-chip data partitioning read-write system of the present invention, it further comprises:

the data partitioning module further comprises:

an address partitioning submodule for partitioning an address space into an off-chip data space and an on-chip data space;

a data replacement submodule for performing data replacement between the on-chip storage medium and the off-chip storage medium based on a data replacement strategy, wherein the data replacement strategy comprises an ordinal replacement, a reversed replacement and a random replacement;

the data partitioning strategy comprises fixed-point number partitioning and floating-point number partitioning; the data partitioning module is implemented based on one or more on-chip calculation units in a chip, and the on-chip calculation units initiate a read and write request, and process the original data obtained by splicing;

the data splicing module further comprises:

an index splicing submodule for converting an on-chip and off-chip data transmission form from the representation of the original data into all or partial data index to splice results of the all or partial data index on the chip to acquire the representation of the original data;

read and write of the data splicing module are implemented through an on-chip and off-chip data path, or an on-chip data path, the on-chip and off-chip data path comprises PCI, PCIE and HT interconnection techniques, the on-chip data path comprises FAT-TREE and H-TREE interconnection techniques, and the on-chip and off-chip connection way comprises a multichip interconnection structure;

data in the on-chip storage medium and the off-chip storage medium is read and written once or for many times, and the data is read into one or more on-chip calculation units; the on-chip storage medium or the off-chip storage medium is read and written from outside once or for many times, and the on-chip storage medium is read and written from inside once or for many times.

The present invention provides an on-chip read-write device, comprising any one of the above on-chip data partitioning read-write system.

Regarding the on-chip read-write device of the present invention, the on-chip read-write device comprises a Static Random Access Memory (SRAM), a Dynamic Random Access Memory (DRAM), an Enhanced Dynamic Random Access Memory (eDRAM), a Register file (RF), and a Non-Volatile Memory (NVM), or a 3D storage device.

DETAILED DESCRIPTION

In order to make the object, the technical solution and the advantages of the present invention clearer, the present invention is further explained in detail with reference to the drawings and the examples. It shall be understood that the specific examples described here are only to explain the present invention, but not to limit the present invention.

As for the current heterogeneous platform, the data which can be stored on a chip of an accelerator is limited, hence, it is required to partition the data into data blocks that can be stored on the chip, and the required data block is read in or written out through data interaction on an off-chip large storage medium and an on-chip small storage medium.

Figure 1:
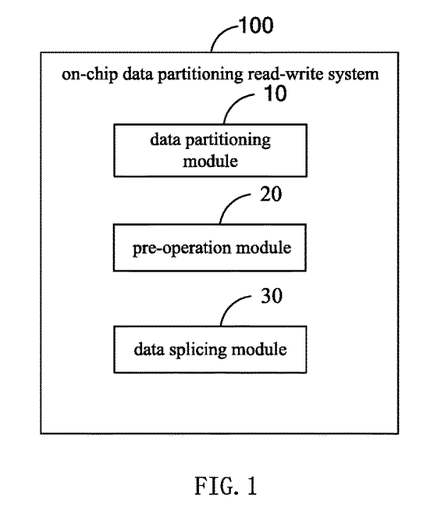
FIG. 1 is a structure diagram of the on-chip data partitioning read-write system according to the present invention.

In order to achieve the object, FIG. 1 illustrates that the present invention provides an on-chip data partitioning read-write system 100, comprising:

a data partitioning module 10 for partitioning on-chip storage data into different areas, and storing the on-chip data in an on-chip storage medium and an off-chip storage medium respectively, based on a data partitioning strategy;

a pre-operation module 20 for performing an operational processing of an on-chip address index of the on-chip storage data in advance when implementing data splicing; and a data splicing module 30 for splicing the on-chip storage data and the off-chip input data to obtain a representation of the original data based on a data splicing strategy.

Figure 2:
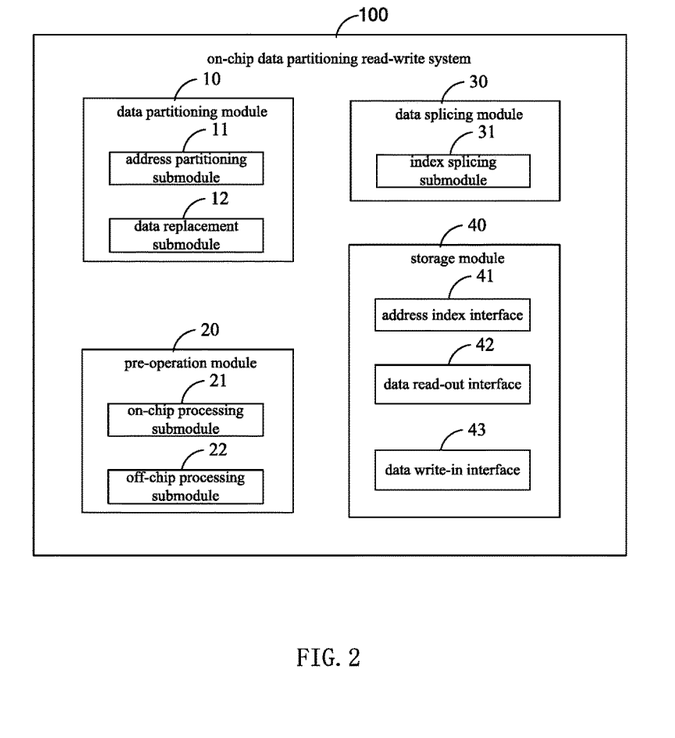
FIG. 2 is a structure diagram of the on-chip data partitioning read-write system of the preferable example according to the present invention.
Figure 5:
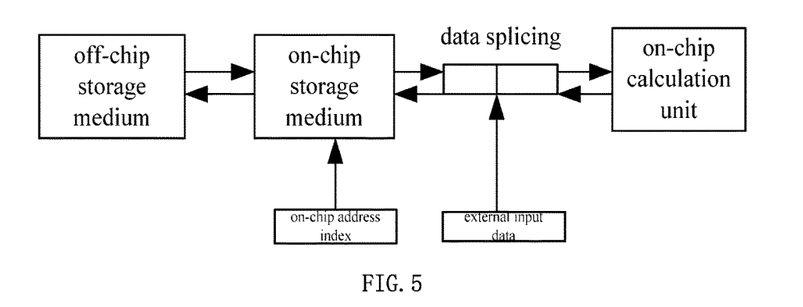
FIG. 5 is a physical frame diagram of the on-chip data partitioning read-write method according to the present invention.

As for the heterogeneous platform, the data which can be stored on a chip of an accelerator is limited, hence, it is required to partition the data into data blocks that can be stored on the chip, and the required data block is read in or written out through data interaction on the off-chip large storage medium and the on-chip small storage medium. During the time, an on-chip data address is provided to on-chip calculation units based on the on-chip address index depending on requirements, and the physical frame is illustrated in FIG. 5. Partitioning in examples of FIGS. 2 and 3 is only for typical circumstances of the present invention, the present invention is not limited to specific data partitioning, and for example, the circumstance in which all data is partitioned on the chip, or all data is partitioned off the chip is also within the range of implementing the present invention.

Further, the on-chip data partitioning read-write system 100 of the present invention further comprises:

a storage module 40 for storing and carrying the on-chip storage data of the on-chip storage medium and the off-chip input data from the off-chip storage medium;

the read port and the write port which are separated from each other are adopted in the storage module 40, and read and write of the data are independent from each other;

the pre-processing module 20 further comprises:

an on-chip processing submodule 21 for performing an operational processing of the on-chip storage data;

an off-chip processing submodule 22 for performing an operational processing of external input data; and the external input data comprises the off-chip input data, and data directly read from the read-write ports.

Further, the storage module 40 further comprises:

an address index interface 41 for indexing the on-chip storage data based on the on-chip address index;

a data read-out interface 42 for outputting the indexed on-chip storage data to an exit;

a data write-in interface 43 for writing the data to be stored into corresponding storage positions based on writing addresses.

Figure 3A:
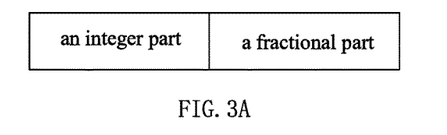
FIG. 3A is a schematic diagram of implementing the on-chip data partitioning strategy according to the present invention.
Figure 3B:
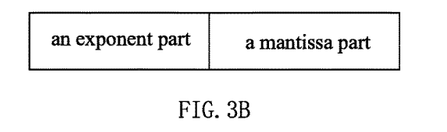
FIG. 3B is the other schematic diagram of implementing the on-chip data partitioning strategy according to the present invention.

As regards to the on-chip data partitioning read-write system 100, preferably, the data partitioning module 10 further comprises:

an address partitioning submodule 11 for partitioning an address space into an off-chip data space and an on-chip data space;

a data replacement submodule 12 for performing data replacement between the on-chip storage medium and the off-chip storage medium based on a data replacement strategy, wherein the data replacement strategy comprises an ordinal replacement, a reversed replacement and a random replacement;

the data partitioning strategy comprises fixed-point number partitioning and floating-point number partitioning. As a typical example, as shown in FIG. 3A, it is exemplary data partitioning of a fixed-point number, which partitions the fixed-point data into an integer part and a fractional part; FIG. 3B illustrates exemplary data partitioning of a floating-point number, which partitions the floating-point data into an exponent part and a mantissa part. Partitioning in examples of FIGS. 3A and 3B is only for typical circumstances of the present invention, the present invention is not limited to specific data partitioning, and for example, the circumstance in which all data is partitioned on the chip, or all data is partitioned off the chip, and an on-chip cache architecture comprises caching input data is also within the range of design of the present invention. The address partitioning submodule 11 partitions the indexed address space into the corresponding off-chip data space and on-chip data space, and if desired, the data replacement submodule 12 performs data exchange to transfer the data to be acceleration processed into the chip. The data partitioning module 10 is implemented based on one or more on-chip calculation units in the chip, and the on-chip calculation units initiate a read and write request, and process the original data obtained by splicing.

The data splicing module 30 further comprises:

an index splicing submodule 31 for converting an on-chip and off-chip data transmission form from the representation of the original data into all or partial data index, so as to splice results of the all or partial data index on a chip to acquire the representation of the original data;

read and write of the data splicing module 30 are implemented through an on-chip and off-chip data path, or an on-chip data path, the on-chip and off-chip data path comprises Peripheral Component Interconnect (PCI), Peripheral Component Interface Express (PCIE) and Hyper Transport (HT, which is a new interconnection bus technology having a novel end-to-end integrated circuit with upgradability, high speed and high performance) interconnection techniques, the on-chip data path comprises FAT-TREE and H-TREE (hierarchy tree) interconnection techniques, and the on-chip and off-chip connection way comprises a multichip interconnection structure. The on-chip and off-chip data connection illustrated in FIG. 1 is not limited to the PCIE bus connection, and also includes the multichip interconnection structure, such as, an on-chip network. The data path of the on-chip calculation units and the on-chip storage medium illustrated in FIG. 1 is not limited to the interconnection techniques of H-TREE, or FAT-TREE. By means of the on-chip and off-chip data path, off-chip addressing can be performed, such that the on-chip data partitioning read-write system 100 can accurately restore various data to be spliced to the original data, and different data partitioning strategies can be effectively supported, thereby reducing exchange of the on-chip and off-chip data.

The data in the on-chip storage medium or the off-chip storage medium is read and written once or for many times, and the data are read into one or more on-chip calculation units; the on-chip storage medium or the off-chip storage medium is read and written from outside once or for many times, and the medium is read and written from inside once or for many times.

Figure 4:
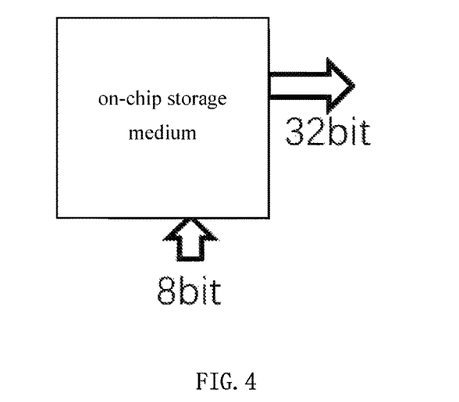
FIG. 4 is a schematic diagram of an indexing example of the on-chip data of the on-chip data partitioning read-write system according to the present invention.
Figure 7:
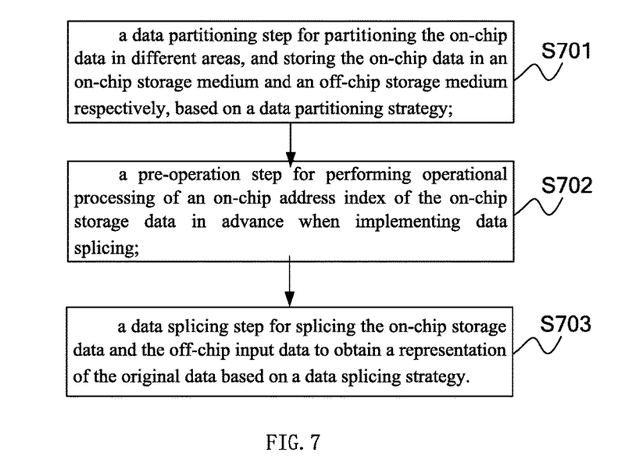
FIG. 7 is a flow diagram of the on-chip data partitioning read-write method according to the present invention.

FIG. 4 is a flow diagram of one specific example of the on-chip data partitioning read-write method according to the present invention, wherein it can be implemented by the on-chip data partitioning read-write system 100 of the present invention illustrated in FIGS. 1-2. As shown in FIG. 7, the on-chip data partitioning read-write method comprises:

Step S701, a data partitioning step for storing on-chip data in different areas, and storing the on-chip data in an on-chip storage medium and an off-chip storage medium respectively, based on a data partitioning strategy;

Step S702, a pre-operation step for performing an operational processing of an on-chip address index of the on-chip storage data in advance when implementing data splicing; and Step S703, a data splicing step for splicing the on-chip storage data and the off-chip input data to obtain a representation of the original data based on a data splicing strategy.

They are implemented by the data partitioning module 10, the pre-operation module 20 and the data splicing module 30, and the original data is losslessly restored in the chip.

Preferably, the on-chip data partitioning read-write method of the present invention achieves storage management, and the splicing process is supported by the storage module 40. The data partitioning read-write method further comprises: a data storing step, storing and carrying the on-chip storage data of the on-chip storage medium and the off-chip input data from the off-chip storage medium; read-write ports are separated in the data storing step, and read and write of the data are independent from each other. Specifically, the data storing step further comprises:

firstly, indexing the on-chip storage data based on the on-chip address index;

secondly, outputting indexed data to an exit;

thirdly, writing the data to be stored into corresponding storage positions based on writing addresses.

When read and write are performed, support is provided by the address index interface 41, the data read-out interface 42 and the data write-in interface 43 to cooperate with the on-chip and off-chip data path and the on-chip data path, so as to achieve data communication in and out of the module, and independent read-write ports can achieve read and write simultaneously. The on-chip data searches the on-chip storage data stored in the chip, and obtain final complete data after splicing operation with data input from outside into the chip based on the on-chip address index that may go through a certain operation (such as, address offset calculation) of the pre-operation module 20.

Figure 8:
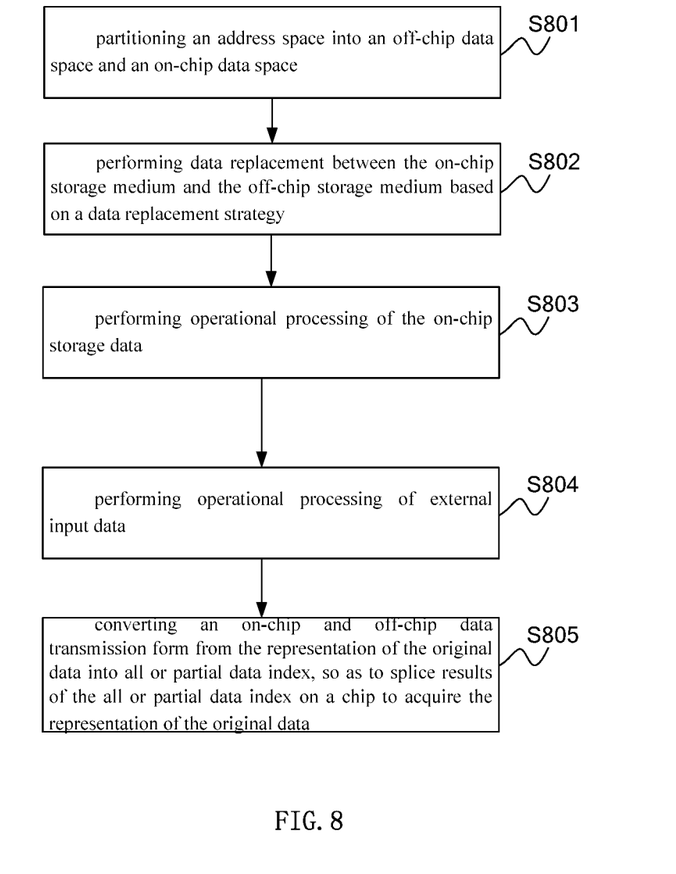
FIG. 8 is a flow diagram of a specific example of the on-chip data partitioning read-write method according to the present invention.

In one specific example, a flow diagram of one preferable example of the preferable on-chip data partitioning read-write method of the present invention is illustrated in FIG. 8, and the on-chip data partitioning read-write method comprises steps of:

Step S801 for partitioning an address space into an off-chip data space and an on-chip data space;

Step S802 for performing data replacement between the on-chip storage medium and the off-chip storage medium based on a data replacement strategy, wherein the data replacement strategy comprises an ordinal replacement, a reversed replacement and a random replacement; the data partitioning strategy comprises fixed-point number partitioning and floating-point number partitioning;

Step S803 for performing an operational processing of the on-chip storage data;

Step S804 for performing an operational processing of external input data; wherein the external input data comprises the off-chip input data, and data directly read from the read-write ports;

Step S805 for converting an on-chip and off-chip data transmission form from the representation of the original data into all or partial data index, so as to splice results of the all or partial data index on a chip to acquire the representation of the original data.

Only if the processed on-chip storage data and off-chip input data are spliced together, the original data can be processed by subsequent modules to achieve the function of the accelerator.

Figure 6:
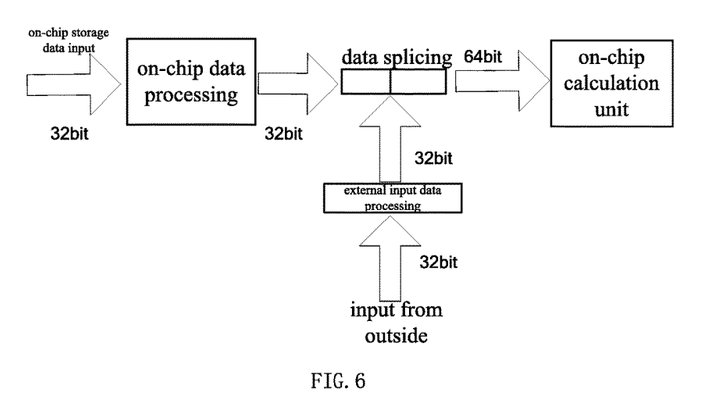
FIG. 6 is a physical design frame diagram of data splicing operation of one example of the on-chip data partitioning read-write method according to the present invention.

Further, in convenience of understanding, a physical design frame diagram of a specific example illustrated in FIGS. 4-6 is explained below.

As for the heterogeneous platform, the data which can be stored on a chip of an accelerator is limited, hence, it is required to partition the data into data blocks that can be stored on the chip, the required data block is read in or written out through data interaction on the off-chip large storage medium (i.e., the off-chip storage medium) and the on-chip small storage medium (i.e., the on-chip storage medium), and sizes of the data blocks are different, so they are partitioned and stored in different areas, and the off-chip storage medium is added according to different requirements of capacity. During the time, an on-chip data address is provided to on-chip calculation units through the on-chip address index depending on requirements. As shown in FIG. 6, an index is acquired and data corresponding to the index is obtained through the address index interface 41, and FIG. 4 illustrates an on-chip data indexing process of one example. The device indexes 256 storage positions to obtain a 32-bit data according to a 8-bit address, and it is not limited to the bit width of the address index and the bit width of the on-chip data storage illustrated in the figures. Implementation of the flow is further depends on intercommunication between the on-chip storage medium, the off-chip storage medium, the on-chip and off-chip data path and the on-chip data path in hardware.

As shown in FIG. 6, it is a data splicing operation process of one example. In the figure, the on-chip storage data is a 32 bit bit width, and after processing of the on-chip data processing submodule 31, it is a 32 bit bit width. The on-chip data processing submodule 31 is not limited to an addressing operation, and also comprises other operations, such as, arithmetic calculation. In the figure, the off-chip input data is a 32 bit bit width, and after processing of the off-chip data processing submodule 32, it is a 32 bit bit width. After the processed on-chip storage data and off-chip input data are spliced together, it is a 64 bit bit width, which is transmitted to the subsequent modules, such as, on-chip calculation units, for processing. The processed on-chip storage data and off-chip input data are not limited to the bit widths in the figure, and the data block is not limited to a specific data bit width. The data processing is not limited to a specific operation, and may include a complex operation, which is not only simple splicing, but includes other operation processing.

Specifically, the data splicing step is carried out through an on-chip and off-chip data path, or an on-chip data path. Especially, the on-chip and off-chip data path comprises PCI, PCIE and HT interconnection techniques to achieve a data flow in and off the chip, the on-chip data path comprises FAT-TREE and H-TREE interconnection techniques, and the on-chip and off-chip connection way comprises a multichip interconnection structure, such as, an on-chip network.

The data in the on-chip storage medium or the off-chip storage medium can be read and written once or for many times, and the data can be read into one or more on-chip calculation units; the on-chip storage medium or the off-chip storage medium can be read and written from outside once or for many times, and the medium can be read and written from inside once or for many times.

The present invention provides an on-chip read-write device, comprising the on-chip data partitioning read-write system 100. The on-chip read-write device comprises the on-chip storage medium, the off-chip storage medium, the on-chip and off-chip data path and the on-chip data path. Preferably, the on-chip read-write device further comprises common storage mediums, such as, a Static Random Access Memory (SRAM), a Dynamic Random Access Memory (DRAM), an Enhanced Dynamic Random Access Memory (eDRAM), a Register file (RF) and the like, and also may be a novel storage device, such as, a Non-Volatile Memory (NVM), or a 3D storage device.

The present invention converts a representation of data into an index, may efficiently perform repetitive addressing in the on-chip address space, and also may perform addressing of the off-chip address. The device for on-chip repetitive addressing and a strategy used in the heterogeneous environment are different from directly accelerating cache of the data itself, and the hardware support includes the on-chip storage medium, the off-chip storage medium, the address indexing device, the on-chip and off-chip data path and the on-chip data path.

Finally, the present invention aims to different data partitioning strategies, device and method. On the basis of different partitioning strategies, the data is partitioned into different parts, and the device of the present invention supports an device of different partitioning strategies.

In conclusion, the device and the related use method of the present invention can effectively provide the requirements of reusability of the data and flexible addressing, effectively reduce memory access bandwidth requirements, can be adapted to different scenes, and are not merely limited to machine learning accelerators. Meanwhile, the present invention can cut on-chip cache overhead by reasonably dispatching data, so as to provide a support for the design of more efficient accelerators.

Certainly, the present invention also may have other examples, and without departing from the spirit and substance of the present invention, those skilled in the art shall make various corresponding modifications and variations according to the present invention, but these corresponding modifications and variations shall belong to the scope protected by the appended claims.

The device and the related use method of the present invention can effectively provide the requirements of reusability of the data and flexible addressing, effectively reduce memory access bandwidth requirements, can be adapted to different scenes, and are not merely limited to machine learning accelerators. Meanwhile, the present invention can cut on-chip cache overhead by reasonably dispatching data, so as to provide a support for the design of more efficient accelerators.

What is claimed is:

1. An on-chip data partitioning read-write method, comprising:
    a data partitioning step for partitioning on chip data in different areas, and storing the on-chip storage data in an on-chip storage medium and an off-chip storage medium respectively, based on a data partitioning strategy, and performing data replacement between the on-chip storage medium and the off-chip storage medium based on a data replacement strategy;
    wherein the data partitioning strategy comprises fixed-point number partitioning and floating-point number partitioning;
    a pre-operation step for performing an operational processing of an on-chip address index of the on-chip storage data in advance when implementing data splicing; and
    a data splicing step for splicing the on-chip storage data and off-chip input data to obtain a representation of original data based on a data splicing strategy;
    the data splicing step comprising converting the representation of the original data into all or partial data index to splice results of the all or partial data index on a chip to acquire the representation of the original data.

2. The on-chip data partitioning read-write method according to claim 1, further comprising:
    a data storing step for storing and carrying the on-chip storage data of the on-chip storage medium and the off-chip input data from the off-chip storage medium;
    a read port and a write port separated from each other and adopted in the data storing step, and read and write of the on-chip storage data and the off-chip input data are independent from each other;
    the pre-operation step further comprises:
    performing an operational processing of the on-chip storage data;
    performing an operational processing of external input data; and
    the external input data comprising the off-chip input data, and the off-chip input data directly read from the read port.

3. The on-chip data partitioning read-write method according to claim 2, wherein the data storing step further comprising:
    indexing the on-chip storage data according to the on-chip address index;
    outputting indexed on-chip storage data to an exit;
    writing the on-chip storage data and the off-chip input data to be stored into corresponding storage positions based on writing addresses.

4. The on-chip data partitioning read-write method according to claim 1, wherein the data partitioning step further comprising:
    partitioning an address space into an off-chip data space and an on-chip data space;
    wherein the data replacement strategy comprising an ordinal replacement, a reversed replacement and a random replacement;
    the data splicing step further comprising:
    the data splicing step is carried out through an on-chip and off-chip data path, or an on-chip data path, the on-chip and off-chip data path comprising Peripheral Component Interconnect (PCI), Peripheral Component Interface Express (PCIE) and Hyper Transport (HT) interconnection techniques, the on-chip data path comprising FAT-TREE and hierarchy tree (H-TREE) interconnection techniques, and the on-chip and off-chip data path comprises a multichip interconnection structure;
    data in the on-chip storage medium or the off-chip storage medium can be read and written once or for many times, and the data in the on-chip storage medium or the off-chip storage medium can be read into one or more on-chip calculation units; the on-chip storage medium or the off-chip storage medium can be read and written from outside once or for many times, and the on-chip storage medium can be read and written from inside once or for many times.

5. An on-chip data partitioning read-write system, comprising:
    a data partitioning module for partitioning on-chip storage data into different areas, and storing the on-chip storage data in an on-chip storage medium and an off-chip storage medium respectively based on a data partitioning strategy;
    wherein the data partitioning module further comprising:
    a data replacement submodule for performing data replacement between the on-chip storage medium and the off-chip storage medium based on a data replacement strategy; the data partitioning strategy comprises fixed-point number partitioning and floating-point number partitioning; the data partitioning module is implemented based on one or more on-chip calculation units in a chip, and the on-chip calculation units initiate a read and write request, and process original data obtained by splicing;
    a pre-operation module for performing an operational processing of an on-chip address index of the on-chip storage data in advance when implementing data splicing; and a data splicing module for splicing the on-chip storage data and off-chip input data to obtain a representation of original data based on a data splicing strategy;

the data splicing module further comprises: an index splicing submodule for converting an on-chip and off-chip data transmission form from the representation of the original data into all or partial data index to splice results of the all or partial data index on the chip to acquire the representation of the original data.

6. The on-chip data partitioning read-write system according to claim 5, further comprising:

a storage module for storing and carrying the on-chip storage data of the on-chip storage medium and the off-chip input data from the off-chip storage medium;

a read port and a write port which are separated from each other and are adopted in the storage module, and read and write of the on-chip storage data and the off-chip input data are independent from each other;

the pre-operation module further comprising:

an on-chip processing submodule for performing an operational processing of the on-chip storage data;

an off-chip processing submodule for performing an operational processing of external input data; and the external input data comprises the off-chip input data, and the off-chip input data directly read from the read port.

7. The on-chip data partitioning read-write system according to claim 6, wherein the storage module further comprising:

an address index interface for indexing the on-chip storage data based on the on-chip address index;

a data read-out interface for outputting indexed on-chip storage data to an exit;

a data write-in interface for writing the on-chip storage data and the off-chip input data to be stored into corresponding storage positions based on writing addresses.

8. The on-chip data partitioning read-write system according to claim 5, wherein the data partitioning module further comprising:

an address partitioning submodule for partitioning an address space into an off-chip data space and an on-chip data space;

wherein the data replacement strategy comprising an ordinal replacement, a reversed replacement and a random replacement;

the data splicing module further comprises:

read and write of the data splicing module are implemented through an on-chip and off-chip data path, or an on-chip data path, the on-chip and off-chip data path comprises Peripheral Component Interconnect (PCI), Peripheral Component Interface Express (PCIE) and Hyper Transport (HT) interconnection techniques, the on-chip data path comprises FAT-TREE and hierarchy tree (H-TREE) interconnection techniques, and the on-chip and off-chip data path comprises a multichip interconnection structure;

data in the on-chip storage medium or the off-chip storage medium is read and written once or for many times, and the data in the on-chip storage medium or the off-chip storage medium is read into one or more on-chip calculation units; the on-chip storage medium or the off-chip storage medium is read and written from outside once or for many times, and the on-chip storage medium is read and written from inside once or for many times.

9. An on-chip read-write device, comprising an on-chip data partitioning read-write system;

wherein the on-chip data partitioning read-write system comprising:

a data partitioning module for partitioning on-chip storage data into different areas, and storing the on-chip storage data in an on-chip storage medium and an off-chip storage medium respectively, based on a data partitioning strategy;

wherein the data partitioning module further comprising:

a data replacement submodule for performing data replacement between the on-chip storage medium and the off-chip storage medium based on a data replacement strategy; the data partitioning strategy comprises fixed-point number partitioning and floating-point number partitioning; the data partitioning module is implemented based on one or more on-chip calculation units in a chip, and the on-chip calculation units initiate a read and write request, and process original data obtained by splicing;

a pre-operation module for performing an operational processing of an on-chip address index of the on-chip storage data in advance when implementing data splicing; and a data splicing module for splicing the on-chip storage data and off-chip input data to obtain a representation of original data based on a data splicing strategy;

the data splicing module further comprises: an index splicing submodule for converting an on-chip and off-chip data transmission form from the representation of the original data into all or partial data index to splice results of the all or partial data index on the chip to acquire the representation of the original data.

10. The on-chip read-write device according to claim 9, wherein the on-chip read-write device further comprising Static Random Access Memory (SRAM), a Dynamic Random Access Memory (DRAM), an Enhanced Dynamic Random Access Memory (eDRAM), a Register file (RF), and a Non-Volatile Memory (NVM).

11. An on-chip read-write device, comprising an on-chip data partitioning read-write system wherein the on-chip data partitioning read-write system comprising:

a data partitioning module for partitioning on-chip storage data into different areas, and storing the on-chip storage data in an on-chip storage medium and an off-chip storage medium respectively, based on a data partitioning strategy;

wherein the data partitioning module further comprising:

a data replacement submodule for performing data replacement between the on-chip storage medium and the off-chip storage medium based on a data replacement strategy; the data partitioning strategy comprises fixed-point number partitioning and floating-point number partitioning; the data partitioning module is implemented based on one or more on-chip calculation units in a chip, and the on-chip calculation units initiate a read and write request, and process original data obtained by splicing;

a pre-operation module for performing an operational processing of an on-chip address index of the on-chip storage data in advance when implementing data splicing; and a data splicing module for splicing the on-chip storage data and off-chip input data to obtain a representation of original data based on a data splicing strategy;

the data splicing module further comprises: an index splicing submodule for converting an on-chip and off-chip data transmission form from the representation of the original data into all or partial data index to splice results of the all or partial data index on the chip to acquire the representation of the original data;
a storage module for storing and carrying the on-chip storage data of the on-chip storage medium and the off-chip input data from the off-chip storage medium;
a read port and a write port which are separated from each other and are adopted in the storage module, and read and write of the on-chip storage data and the off-chip input data are independent from each other;
the pre-operation module further comprising:
an on-chip processing submodule for performing an operational processing of the on-chip storage data;
an off-chip processing submodule for performing an operational processing of external input data; and
the external input data comprises the off-chip input data, and the off-chip input data directly read from the read-write ports.

12. The on-chip read-write device according to claim 11, wherein the on-chip read-write device further comprising a Static Random Access Memory (SRAM), a Dynamic Random Access Memory (DRAM), an Enhanced Dynamic Random Access Memory (eDRAM), a Register file (RF), and a Non-Volatile Memory (NVM).

13. An on-chip read-write device, comprising an on-chip data partitioning read-write system:
wherein the on-chip data partitioning read-write system comprising:
a data partitioning module for partitioning on-chip storage data into different areas, and storing the on-chip storage data in an on-chip storage medium and an off-chip storage medium respectively, based on a data partitioning strategy;
wherein the data partitioning module further comprising:
a data replacement submodule for performing data replacement between the on-chip storage medium and the off-chip storage medium based on a data replacement strategy; the data partitioning strategy comprises fixed-point number partitioning and floating-point number partitioning; the data partitioning module is implemented based on one or more on-chip calculation units in a chip, and the on-chip calculation units initiate a read and write request, and process original data obtained by splicing;
a pre-operation module for performing an operational processing of an on-chip address index of the on-chip storage data in advance when implementing data splicing; and
a data splicing module for splicing the on-chip storage data and off-chip input data to obtain a representation of original data based on a data splicing strategy;
the data splicing module further comprises: an index splicing submodule for converting an on-chip and off-chip data transmission form from the representation of the original data into all or partial data index to splice results of the all or partial data index on the chip to acquire the representation of the original data;
a storage module for storing and carrying the on-chip storage data of the on-chip storage medium and the off-chip input data from the off-chip storage medium, comprising:
an address index interface for indexing the on-chip storage data based on the on-chip address index;
a data read-out interface for outputting the indexed on-chip storage data to an exit;
a data write-in interface for writing the on-chip storage data and the off-chip input data to be stored into corresponding storage positions based on writing addresses;
a read port and a write port which are separated from each other and are adopted in the storage module, and read and write of the on-chip storage data and the off-chip input data are independent from each other;
the pre-operation module further comprising:
an on-chip processing submodule for performing an operational processing of the on-chip storage data;
an off-chip processing submodule for performing an operational processing of external input data; and
the external input data comprises the off-chip input data, and the off-chip input data directly read from the read port.

14. The on-chip read-write device according to claim 13, wherein the on-chip read-write device further comprising a Static Random Access Memory (SRAM), a Dynamic Random Access Memory (DRAM), an Enhanced Dynamic Random Access Memory (eDRAM), a Register file (RF), and a Non-Volatile Memory (NVM).

15. An on-chip read-write device, comprising an on-chip data partitioning read-write system;
wherein the on-chip data partitioning read-write system comprising:
a data partitioning module for partitioning on-chip storage data into different areas, and storing the on-chip storage data in an on-chip storage medium and an off-chip storage medium respectively, based on a data partitioning strategy;
wherein the data partitioning module further comprising:
an address partitioning submodule for partitioning an address space into an off-chip data space and an on-chip data space;
a data replacement submodule for performing data replacement between the on-chip storage medium and the off-chip storage medium based on a data replacement strategy, wherein the data replacement strategy comprising an ordinal replacement, a reversed replacement and a random replacement;
the data partitioning strategy comprises fixed-point number partitioning and floating-point number partitioning; the data partitioning module is implemented based on one or more on-chip calculation units in a chip, and the on-chip calculation units initiate a read and write request, and process original data obtained by splicing;
a pre-operation module for performing an operational processing of an on-chip address index of the on-chip storage data in advance when implementing data splicing; and
a data splicing module for splicing the on-chip storage data and off-chip input data to obtain a representation of the original data based on a data splicing strategy;
the data splicing module further comprises:
an index splicing submodule for converting an on-chip and off-chip data transmission form from the representation of the original data into all or partial data index to splice results of the all or partial data index on the chip to acquire the representation of the original data;
read and write of the data splicing module are implemented through an on-chip and off-chip data path, or an on-chip data path, the on-chip and off-chip data path comprises Peripheral Component Interconnect (PCI), Peripheral Component Interface Express (PCIE) and Hyper Transport (HT) interconnection techniques, the on-chip data path comprises FAT-TREE and hierarchy tree (H-TREE) interconnection techniques, and the on-chip and off-chip connection way comprises a multichip interconnection structure;

data in the on-chip storage medium or the off-chip storage medium is read and written once or for many times, and the data in the on-chip storage medium or the off-chip storage medium is read into one or more on-chip calculation units; the on-chip storage medium or the off-chip storage medium is read and written from outside once or for many times, and the on-chip storage medium is read and written from inside once or for many times.

16. The on-chip read-write device according to claim 15, wherein the on-chip read-write device further comprising a Static Random Access Memory (SRAM), a Dynamic Random Access Memory (DRAM), an Enhanced Dynamic Random Access Memory (eDRAM), a Register file (RF), and a Non-Volatile Memory (NVM), or a 3D storage device.

* * * * *